US009996487B2

(12) United States Patent
Niell et al.

(10) Patent No.: US 9,996,487 B2
(45) Date of Patent: Jun. 12, 2018

(54) COHERENT FABRIC INTERCONNECT FOR USE IN MULTIPLE TOPOLOGIES

(71) Applicant: Intel Corporation, Santa Clara, CA (US)

(72) Inventors: Jose S. Niell, Franklin, MA (US); Daniel F. Cutter, Maynard, MA (US); Stephen J. Robinson, Austin, TX (US); Mukesh K. Patel, Round Rock, TX (US)

(73) Assignee: INTEL CORPORATION, Santa Clara, CA (US)

( * ) Notice: Subject to any disclaimer, the term of this patent is extended or adjusted under 35 U.S.C. 154(b) by 181 days.

(21) Appl. No.: 14/751,899

(22) Filed: Jun. 26, 2015

(65) Prior Publication Data

US 2016/0378701 A1 Dec. 29, 2016

(51) Int. Cl.
G06F 13/36 (2006.01)
G06F 11/00 (2006.01)
G06F 13/28 (2006.01)
G06F 13/40 (2006.01)
G06F 12/0868 (2016.01)

(52) U.S. Cl.
CPC .......... G06F 13/28 (2013.01); G06F 12/0868 (2013.01); G06F 13/4068 (2013.01); G06F 2212/608 (2013.01)

(58) Field of Classification Search
None
See application file for complete search history.

(56) References Cited

U.S. PATENT DOCUMENTS

| 8,643,519 B1 | 2/2014 | Kutz et al. | |
| 2004/0230750 A1* | 11/2004 | Blake | G06F 12/0822 711/146 |
| 2014/0089533 A1* | 3/2014 | Saripalli | G06F 9/4812 710/8 |
| 2014/0181419 A1 | 6/2014 | Saund et al. | |
| 2014/0189187 A1 | 7/2014 | Acharya et al. | |
| 2014/0192801 A1 | 7/2014 | Machnicki | |
| 2014/0201500 A1 | 7/2014 | Niell et al. | |
| 2014/0282819 A1* | 9/2014 | Sastry | G06F 21/57 726/1 |
| 2016/0012010 A1* | 1/2016 | Ganapathy | G06F 13/4036 710/104 |
| 2016/0110275 A1* | 4/2016 | Michalovich | G06F 11/3656 714/43 |

OTHER PUBLICATIONS

Notification of Transmittal of the International Search Report and the Written Opinion of the International Searching Authority issued for International Patent Application No. PCT/US2016/034190, dated Sep. 7, 2016.

* cited by examiner

Primary Examiner — Hyun Nam
(74) Attorney, Agent, or Firm — Womble Bond Dickinson (US) LLP

(57) ABSTRACT

An apparatus having a fabric interconnect that supports multiple topologies and method for using the same are disclosed. In one embodiment, the apparatus comprises mode memory to store information indicative of one of the plurality of modes; and a first fabric operable in a plurality of modes, where the fabric comprises logic coupled to the mode memory to control processing of read and write requests to memory received by the first fabric according to the mode identified by the information indicative.

26 Claims, 10 Drawing Sheets

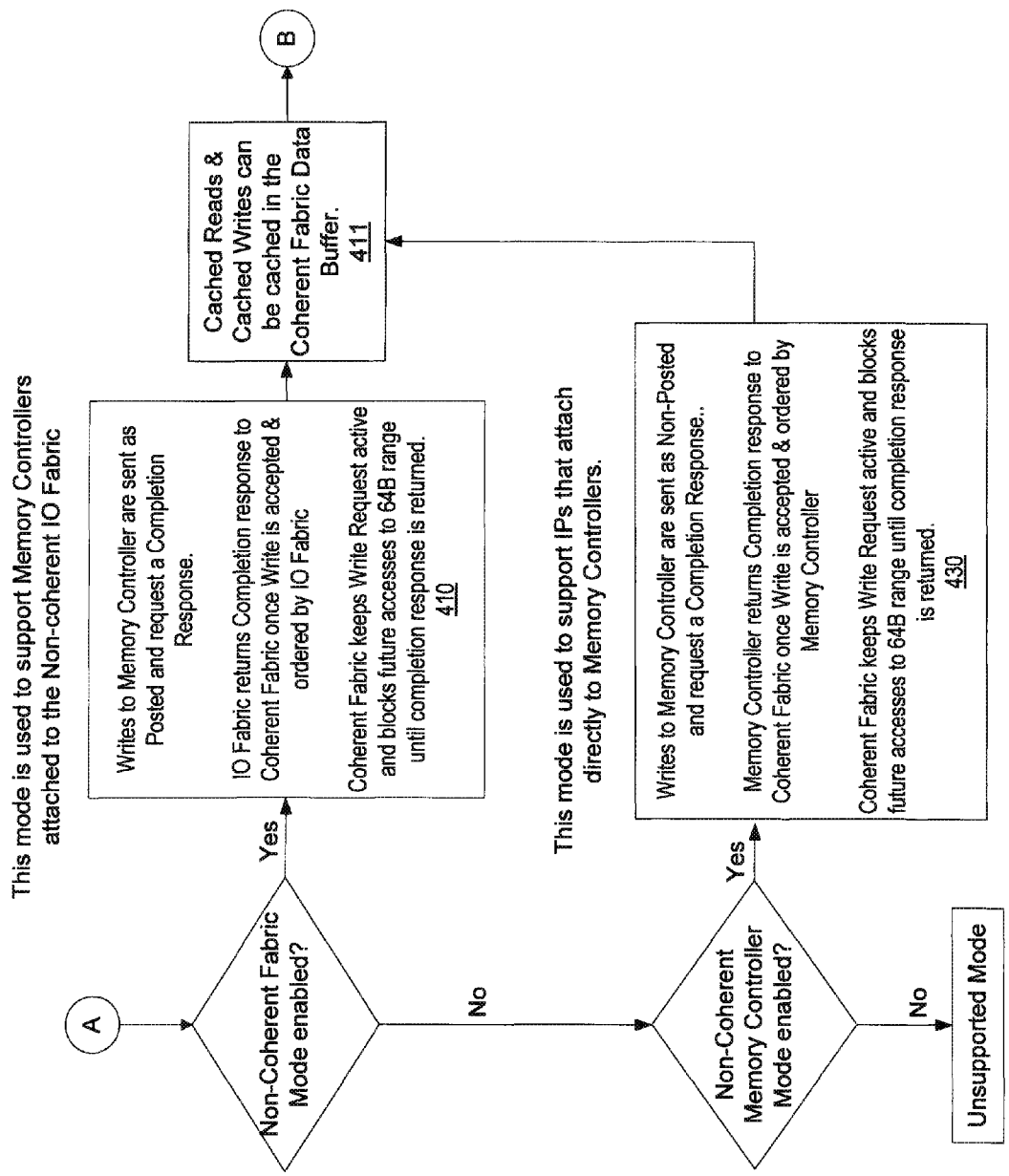

COHERENT FABRIC INTERCONNECT FOR USE IN MULTIPLE TOPOLOGIES

FIELD OF THE INVENTION

Embodiments of the present invention relate to the field of computing systems; more particularly, embodiments of the present invention relate to systems having a fabric to couple multiple devices to a memory.

BACKGROUND OF THE INVENTION

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs.

A system-on-a-chip (SoC) includes a fabric interconnect to connect different devices to system memory. SoCs utilize different fabric interconnect topologies. These fabrics are coherent fabrics. One key characteristic of a chosen SoC topology is the connectivity of the memory controller. In some topologies, the memory controller is connected directly to the coherent fabric so that all central processing units (CPUs) and intellectual property cores (IPs) in the system see a coherent and consistent view of memory. In this topology, hardware in the caching agents (e.g., caching agents in the CPUs) and hardware in the coherent fabric actively manage the state of the caches so that all agents in the SoC observe a consistent view of memory.

In other topologies, the memory controller is connected to a non-coherent fabric or directly to an IP, allowing IPs to access memory without traversing the coherent fabric. In this topology, software uses ordering synchronization, memory fencing, and cache flushing operations from an instruction set architecture (Intel Architecture (IA) instruction set architecture) to manage when and how cacheable data becomes visible to all agents in the SoC. In this topology, hardware is also added to the coherent interconnect fabric that responds to the software initiated transactions to ensure that these software initiated ordering events are handled properly.

Thus, these SoC different topologies used specialized coherent fabrics, one for each topology. The cost and design time required to support multiple different types of fabrics is not a small amount.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks and may be also used in other devices, such as handheld devices, tablets, other thin notebooks, systems-on-a-chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below.

Figure 1:
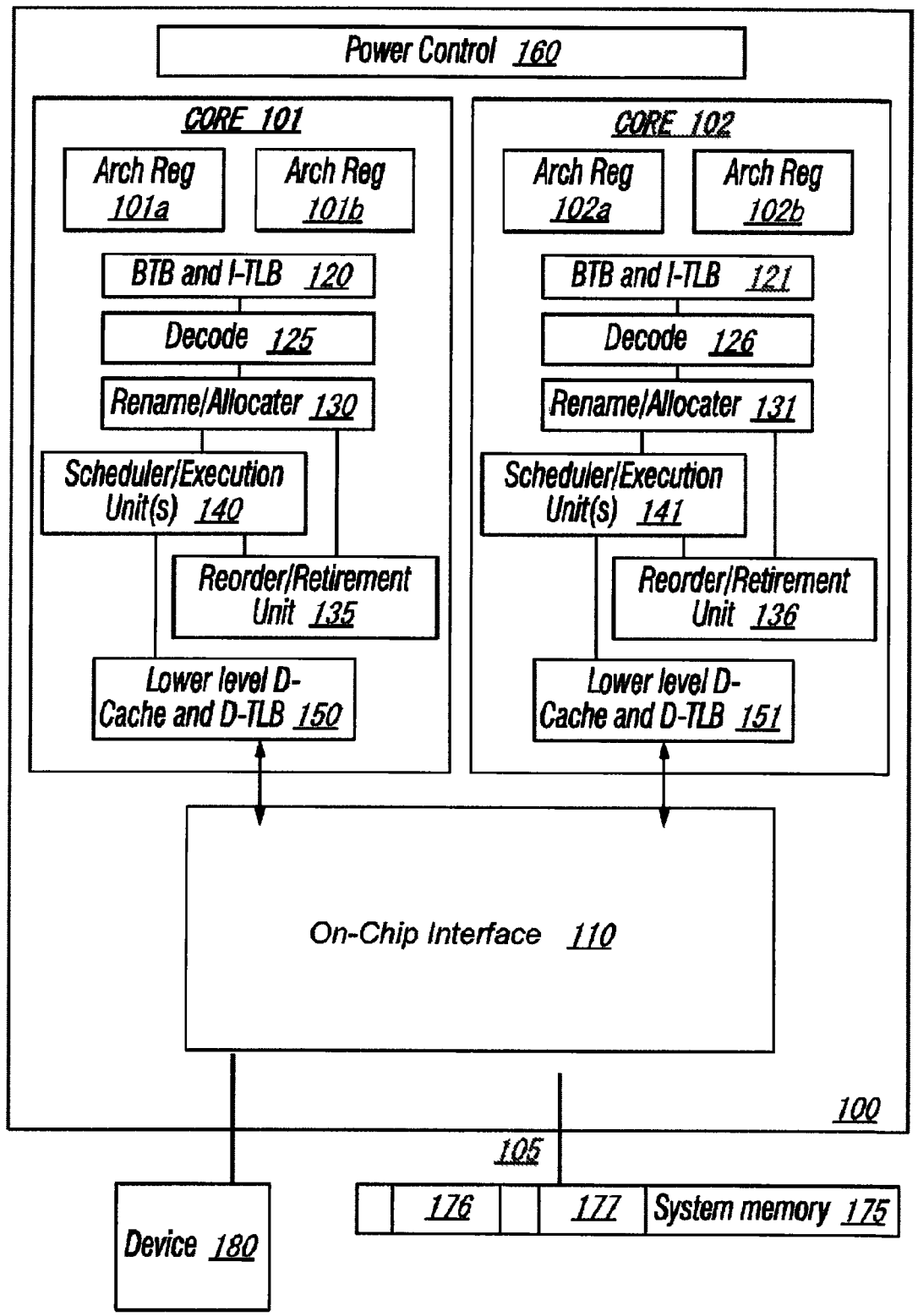
FIG. 1 is a block diagram of one embodiment of a computing system having a multicore processor.

FIG. 1 is a block diagram of one embodiment of a computing system including a multicore processor. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e., cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. In one embodiment, on-chip interface 110 is a shared memory, or coherent, fabric. This coherent fabric may act as a shared memory coherent fabric in one mode or part of a non-shared memory sub-system in different modes, as described in more detail below. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example, in one embodiment, a memory controller hub is on the same package and/or die with processor 100. In one embodiment, a portion of the core (an on-core portion) 110 includes one or more controller(s) for interfacing with other devices such as memory 175 or a graphics device 180. The configuration including an interconnect and controllers for interfacing with such devices is often referred to as an un-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

In various embodiments, a shared memory fabric couples multiple independent devices, also referred to herein as agents, to a shared memory (e.g., via an intervening memory controllers). In one embodiment, the shared memory fabric is an interconnect structure of a single die semiconductor device that includes intellectual property (IP) logic blocks of different types, such as a north complex, south complex, multimedia logic, or specific IP logic. In one embodiment, the semiconductor device includes one or more cores or central processing units (CPUs) with their associated cache memories. In one embodiment, these cores or IP logic blocks share one or more levels of cache memory.

Figure 2:
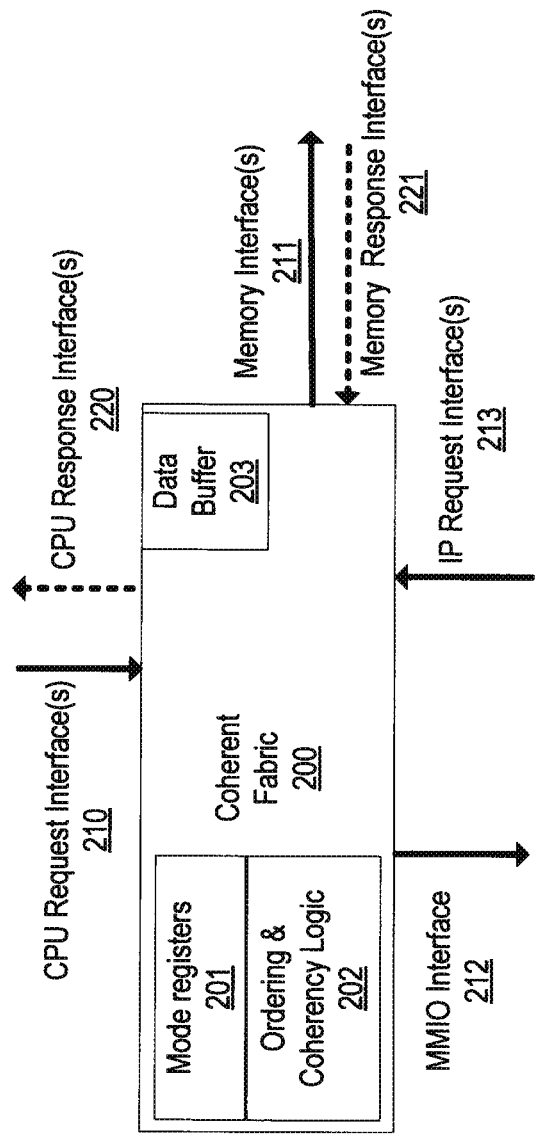
FIG. 2 is a block diagram of one embodiment of a coherent fabric.

In one embodiment, the coherent fabric is able to support multiple topologies with a single coherent fabric. FIG. 2 is a block diagram one embodiment of the coherent fabric 200. Referring to FIG. 2, coherent fabric includes mode memory, or storage (e.g., registers), 201, ordering and coherency logic 202, and data buffer 203. Coherent fabric 200 includes one or more interfaces. In one embodiment, coherent fabric 200 also includes one or more CPU request interfaces 210, one or more CPU response interfaces 220, one or more memory interfaces 211, one or more response interfaces 221, a memory-mapped input/output (MMIO) interface 212 and one or more IP request interfaces 213.

Mode memory 201 included information that indicates the mode in which coherent fabric 200 is to operate. The information is set based on the topology in which coherent fabric 200 is to operate. In one embodiment, mode memory 201 is programmed according to the SOC topology in which the coherent fabric resides (or is to reside), and each of the different SOC topologies has a different path to memory.

In one embodiment, mode memory 201 is programmed by the Basic Input/Output System (BIOS). In another embodiment, mode memory 201 is programmed by firmware. In yet other embodiments, the mode is set in mode memory 201 by a strap or fuse. In one embodiment, the initial value stored in mode memory 201 is selected during design implementation so that the semiconductor device (e.g., SoC, processor) can begin operation in a specific mode. In another embodiment, there are 2 or more mode memories (e.g., registers) to define the mode of operation for 2 or more regions of memory.

Ordering and coherency logic 202 is capable of handling ordering and maintaining memory coherency for different topologies. In one embodiment, ordering and coherency logic 202 controls how the coherent fabric processes write and read requests to memory and/or IO from the CPUs or other IPs and agents in the system according to the mode specified in mode memory 201. More specifically, in one embodiment, ordering and coherency logic 202 control the state of cache memories and data buffers, orchestrate the type and timing of requests on the memory and MMIO interfaces, and orchestrate the timing of CPU responses as per the mode of operation. As such, ordering and coherency logic 202 ensures that all agents in the semiconductor device (e.g., SoC) observe a consistent view of memory as either a fully shared coherent memory system or as a software managed shared memory system.

For example, ordering and coherency logic 202 determines whether to allow reordering of memory operations based on its mode of operation. Ordering and coherency logic 202 manage cacheable data and when and how that data becomes visible to agents in the semiconductor device. Ordering and coherency logic 202 also responds to software initiated transactions to ensure that software initiated cache control and ordering events are handled properly.

Figure 3A:
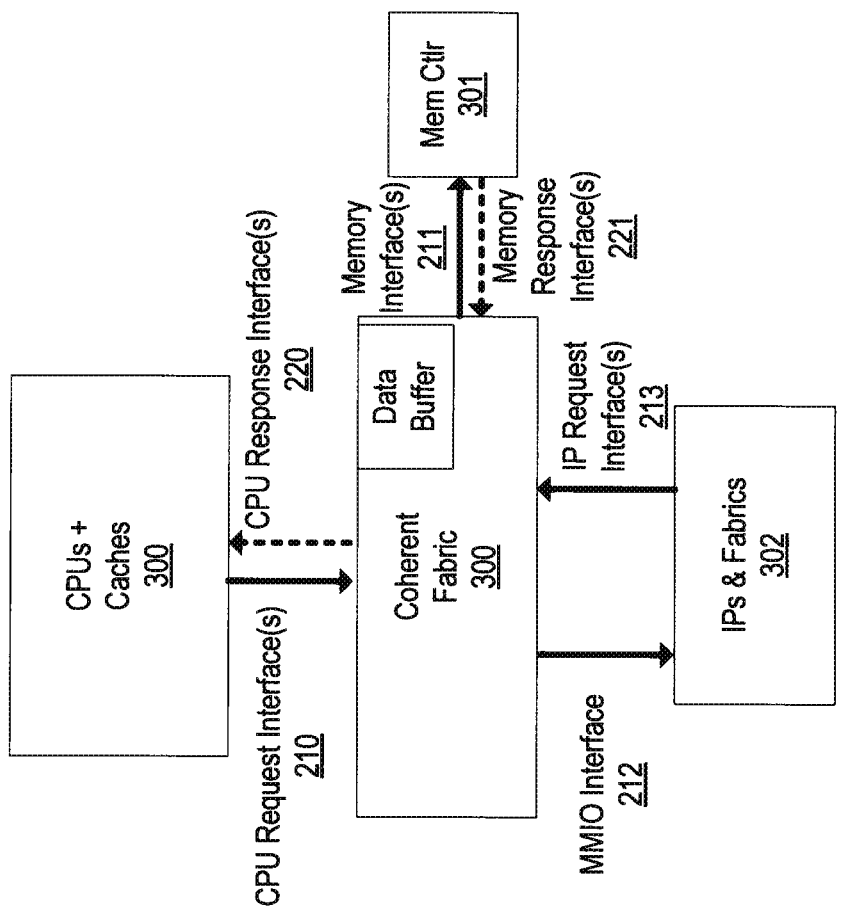
FIGS. 3A-3C illustrate different topologies the coherent fabric of FIG. 2 supports.
Figure 3B:
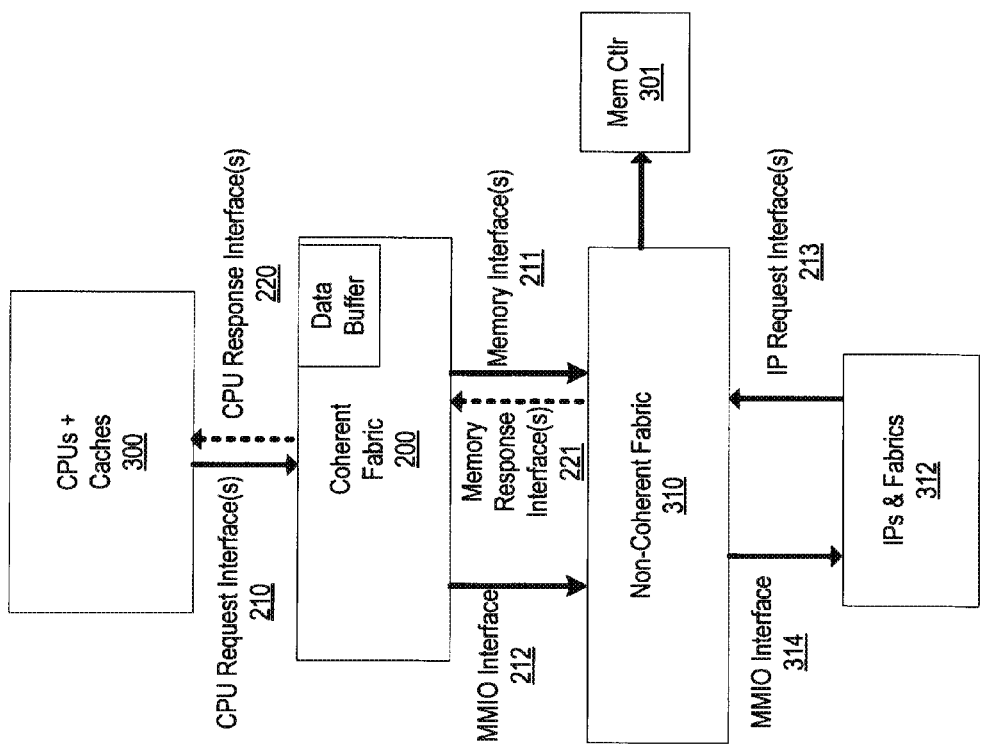
Figure 3C:
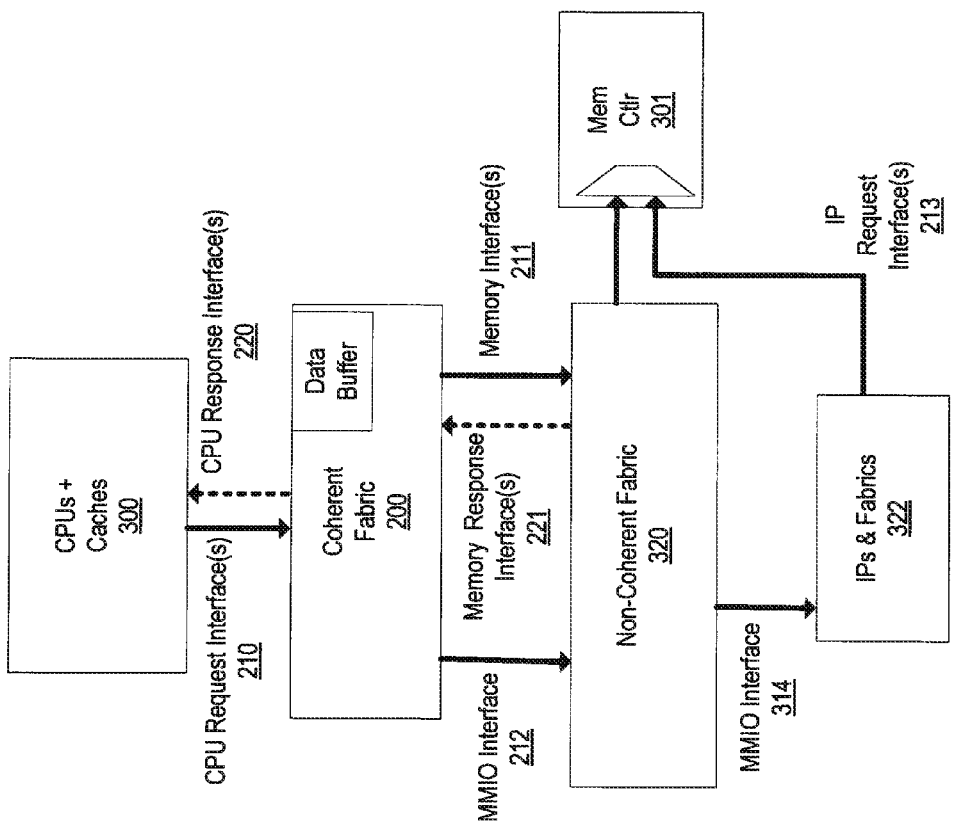

In one embodiment, coherent fabric 200 is operable in three different modes each corresponding to a different topology (e.g., SoC topology). FIGS. 3A-3C illustrate three topologies supported by coherent fabric 200. Referring to FIG. 303A, CPU 300, including its caches, are coupled to coherent fabric 200 via CPU request interface 210. Memory interface 211 of coherent fabric 200 is coupled to memory controller 301 (which is coupled to system memory (e.g., dynamic random access memory (DRAM)). Memory interface 212 and IP request interface 213 are coupled to IP fabric block 302. In this configuration, all access to memory are through coherent fabric 200. In such a case, the data buffer of coherent fabric 200 can be used as a cache.

FIG. 3B illustrates another topology supported by coherent fabric 200. Referring to FIG. 3B, CPU 300 is coupled to coherent fabric 200 as in the first mode, however, the topology of 3B includes a non-coherent fabric 310 that is coupled to coherent fabric 200 via MMIO interface 212 and memory interface 211. Non-coherent fabric 310 is also coupled to memory controller 301. In this topology, IPs and fabrics block 312 is coupled to non-coherent fabric 310 via an IP request interface 213 and MMIO interface 314. Thus, in this topology the memory controller is connected to the non-coherent fabric and allows the IPs to access the memory without traversing coherent fabric 200, while memory requests (e.g., memory read and write operations) from CPUs 300 are sent through memory interface 211 through non-coherent fabric 310 to memory. Thus, in this case, coherent fabric 200 is not aware of access by the IPs to memory as they do not pass through coherent fabric 200.

Lastly, a third topology is supported by coherent fabric 200 when operating in a third mode. This topology is similar to the topology set forth in FIG. 3B in that it includes a non-coherent fabric coupled to the memory controller. However, in this case, the IP request interface 213 from IPs and fabrics block 322 is coupled directly to memory controller 301 along with the non-coherent fabric 320. Therefore, in this topology, both coherent fabric 200 and non-coherent fabric 320 do not know when IPS & fabrics block 322 access memory.

Figure 4:
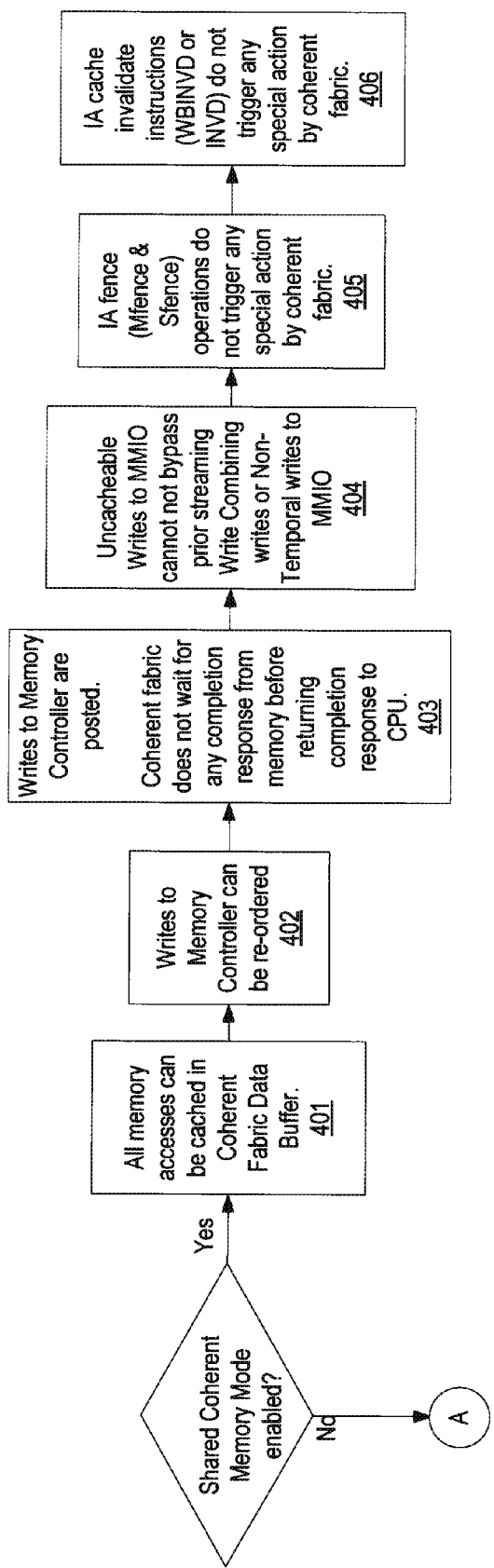
FIG. 4 illustrates ordering and coherency operations performed in different modes of operation for one embodiment of the coherent fabric.
Figure 4:
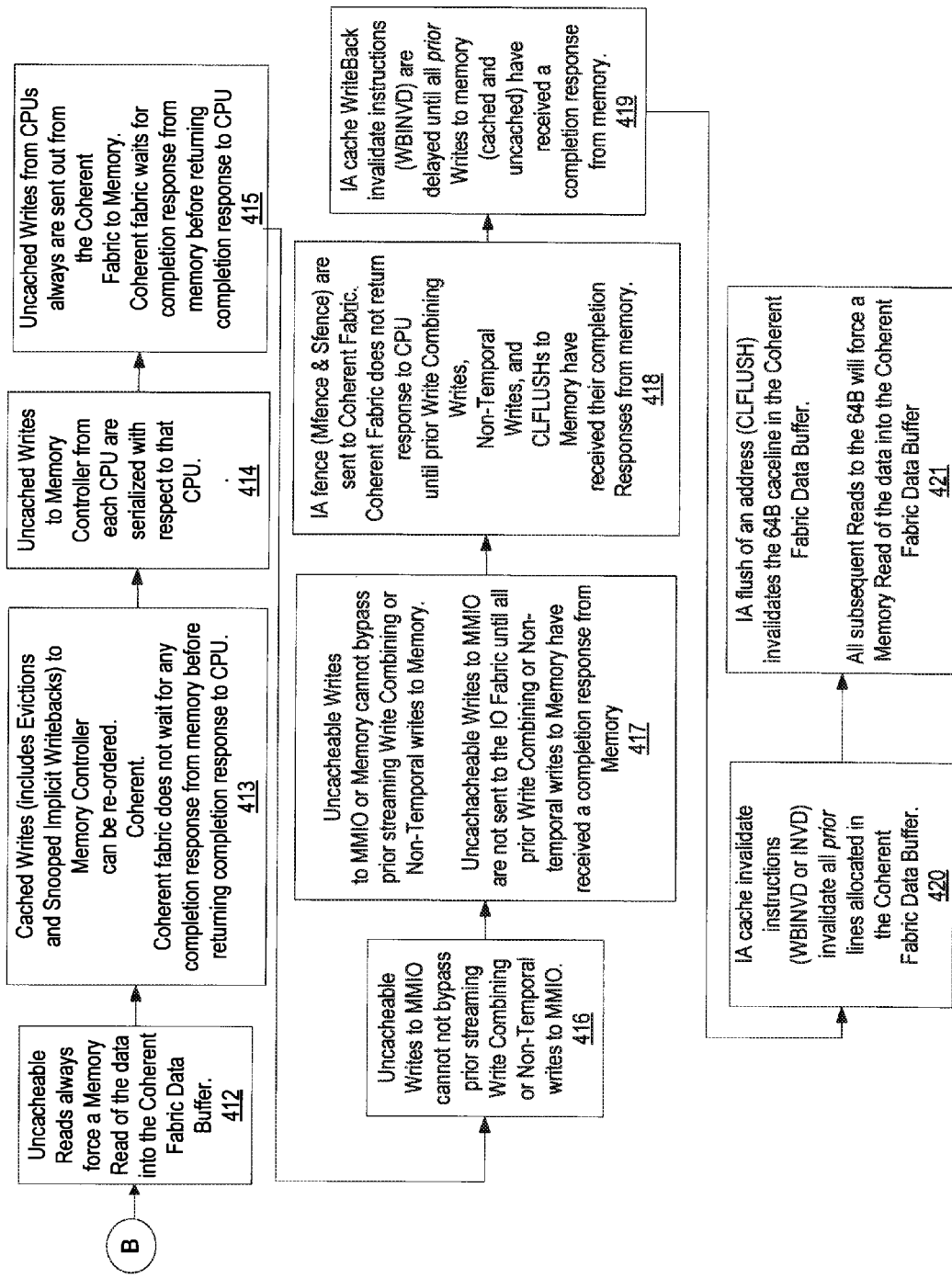

Referring back to FIG. 2, ordering and coherency logic 202 operates and performs ordering and coherency algorithms based on a mode identified in mode memory 201. One embodiment of those ordering in coherency algorithms are set forth in FIG. 4. Referring to FIG. 4, ordering and coherency logic 202 initially determines if it is in Shared coherent memory mode based on the information stored in mode memory 201. In the Shared coherent memory mode, the memory controller is directly attached to the coherent fabric, such as shown in FIG. 3A. If ordering and coherency logic 202 determines that the Shared coherent memory mode is enabled, then ordering and coherency logic 202 allows all memory accesses to be cached in data buffer 203 of the coherent fabric (401) and allows write operations directed to the memory controller may be reordered, if desired (402). There are multiple situations that cause reordering. In the most basic example, data buffer 203 acts as a cache. When it needs to free up a line, it needs to free up an entry. In one embodiment, the logic and/or processing to free up an entry might not be the same as the ordering logic and isn't aware of the order that the write operations occurred. In a more complex example, a memory scheduler integrated into the logic, which would have its own processing to choose/reorder memory requests. Ordering and coherency logic 202 keeps those algorithms in check to force ordering in certain cases, thereby limiting the other processing. In this case, data buffer 203 is treated like a cache memory in that data may be stored in data buffer 203 and never sent to memory (as opposed to other topologies in which such data is flushed to memory to avoid coherency problems). By allowing write operations directed to the memory controller to be reordered, coherent fabric 200 is able to performing scheduling of memory requests and cause the write operations to be executed in an order different from when they were received by coherent fabric 200.

Also, in the coherent fabric mode, ordering and coherency logic 202 acts as if writes to the memory controller are posted with no request for a completion response from the memory controller (403). Furthermore, in the shared coherent memory mode, ordering and coherency logic 202 prevents uncacheable writes to MMIO from bypassing prior streaming write combining writes or non-temporal writes to MMIO (404). Thus, the coherent fabric does not need to orchestrate, delay, or trigger any later events or transactions events based on the memory interface returning a completion response. In the coherent fabric mode, memory fencing operations (e.g., Mfence and Sfence) do not trigger any special action by the coherent fabric (405). In fact, the CPU (e.g., CPU 300) does not need to transfer any memory fence request to the coherent fabric, or the coherent fabric can treat such a memory fence request as a no-operation transaction. Similarly, in the coherent fabric mode, cache invalidate instructions (e.g., WBINVD or INVD) do not trigger any special action by the coherent fabric (406).

If ordering and coherency logic 202 determines that the shared coherent memory mode is not enabled, ordering and coherency logic 202 determines whether the coherent fabric operates in either of two other modes based on information in the mode memory 201. The first of the modes is referred to herein as the non-coherent fabric mode in which memory controllers are attached to a non-coherent IO fabric that is attached to coherent fabric 200. The second of the modes is referred to as non-coherent memory controller mode in which the coherent fabric supports IPs that are attached directly to the memory controller. Note that if coherent fabric 200 is not operating in one of the two non-coherent modes, the information in mode memory 201 is specifying an unsupported mode.

The main difference between non-coherent fabric mode and the non-coherent memory controller mode involves write operations to the memory controller and whether they are posted or not. In the non-coherent fabric mode in which the all memory access goes to the memory controller through the non-coherent fabric, the write operations to the memory controller are sent as posted with a request for a completion response from the TO, or non-coherent, fabric. In such a case, the IO fabric returns a completion response once the write operation is accepted and ordered by the IO fabric. The coherent fabric keeps the write request active and blocks future accesses to the memory range associated with the write until the completion response is returned (410). In other words, the address range remains blocked until the completion response is returned. In one embodiment, that address range is a 64B range.

In the case of the non-coherent memory controller mode, the write operations to the memory controller are sent as non-posted with a request for a completion response. In such a case, the memory controller returns a completion response once the write is accepted and ordered by the memory controller and the coherent fabric keeps the write request active and blocks future accesses to the memory range associated with the write operation until the completion response is returned (430). In other words, the address range remains blocked until the completion response is returned. In one embodiment, the address range is a 64B range.

Apart from the manner in which write operations to the memory controller are handled, ordering and coherency logic 200 performs a number of operations during both the non-coherent fabric mode and the non-coherent memory controller mode in the same manner. Specifically, for both modes, ordering and coherency logic 200 allows cache reads and cache writes to be cached in the coherent fabric data buffer (411) and uncacheable reads always force a memory read of the data into the coherent fabric data buffer (412). In both modes, cached writes (e.g., evictions and snooped implicit writebacks) to the memory controller can be reordered (413). In this case, in one embodiment, the coherent fabric evicts dirty lines out of the data buffer in finite time. Hence, there is no need to flush the data buffer. Note, the order that the writes leave the data buffer may not be the same as the order of writes that occurred in program order.

Also, in both modes, ordering and coherency logic 200 causes uncached writes to the memory controller from each CPU to be performed in a serialized fashion by delaying the response to the CPU until the completion response has returned from the memory interface (414) and always sends uncached writes from the CPU out of the coherent fabric to the memory (415). Furthermore, in both modes, ordering and coherency logic 200 prevents uncacheable writes to MMIO from bypassing prior streaming write combining or non-temporal writes to MMIO (416) and prevents uncacheable writes to MMIO or the memory from bypassing prior streaming write combining or non-temporal writes to memory. Ordering and coherency logic 200 delays uncacheable writes to MMIO and does not send it to the IO fabric until all prior write combining and non-temporal writes to memory have received a completion response on the memory interface.

In both modes, memory fence operations (e.g., Mfence and Sfence) are sent to the coherent fabric. Ordering and coherency logic 200 does not return the fence completion response to the CPU until all prior write combining writes, non-temporal writes, and cache line flush operate (CLflush) to memory have received their completion responses from the memory interface (418). Ordering and coherency logic 200 is responsible for completing the memory fence operations. Also, ordering and coherency logic 200 delays cache writeback and invalidate instructions (WBINVD) until all prior writes to the memory (cached and un-cached) have received a completion response from the memory interface (419). In both modes, cached invalidated instructions (e.g., WBINVD or INVD) invalidate all prior lines allocated in the coherent fabric data buffer 203 (420). Lastly, in both modes, a flush of an address (e.g., CLflush) invalidates a cache line (e.g., 64B cache line) in the coherent fabric data buffer 203 and all subsequent reads to that cache line will force a memory read of the data into the coherent fabric data buffer 203 (421).

Thus, using the ordering and coherency operations specified in FIG. 4, a single fabric is able to support three different SoC topologies.

In one embodiment, the semiconductor device includes two or more fabrics and each can operate in multiple modes. The modes in which each is operating do not have to be the same. For example, one could be operating in the coherent fabric mode described above, while another is operation in the non-coherent IO fabric mode. In one embodiment, all combinations of modes are possible by adding additional routing and multiplexing logic controlled by BIOS, firmware, strap, or fuse to select whether memory requests from IPs & fabrics route directly to the memory controller, or through the non-coherent fabric, or through the coherent fabric.

Figure 5:
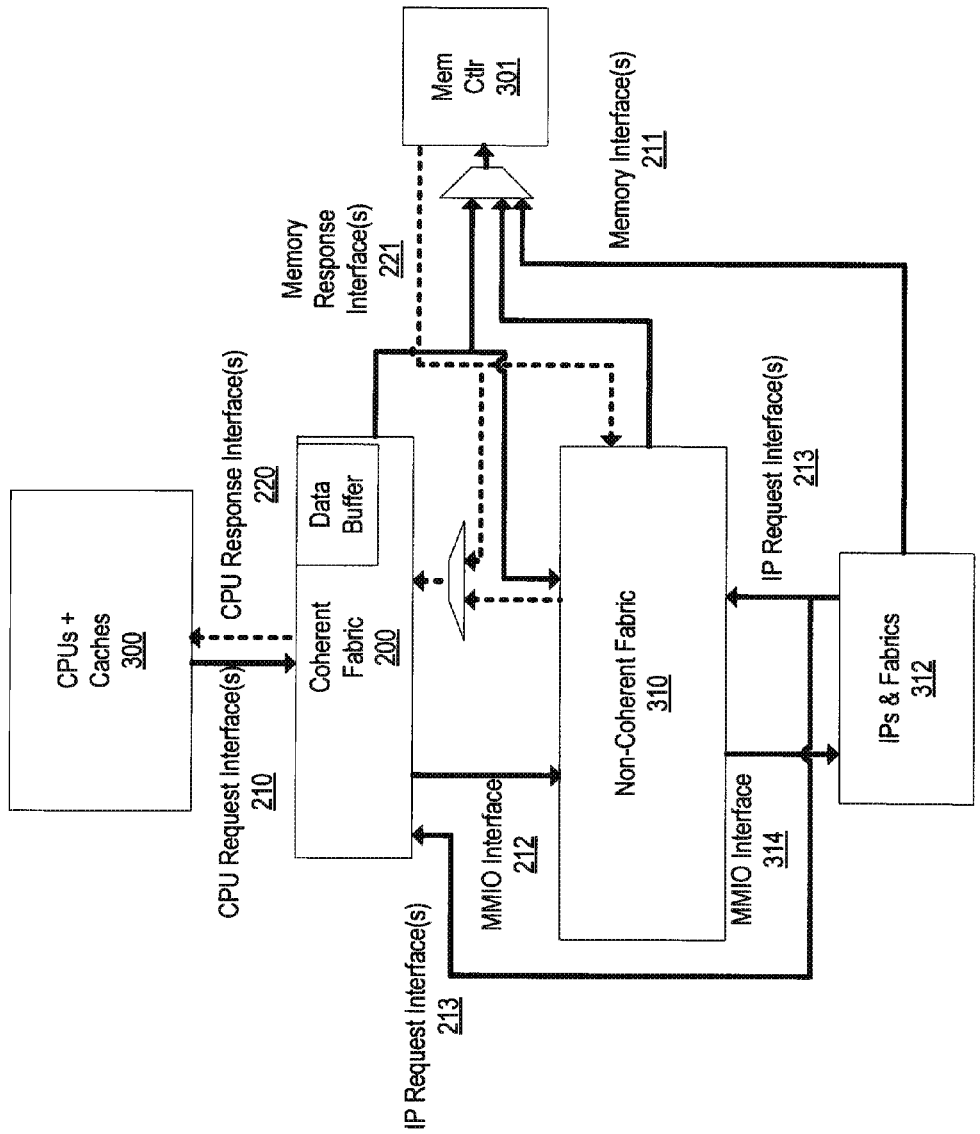
FIG. 5 illustrates another topology supported by one embodiment of a coherent fabric.

FIG. 5 illustrates an example of such a topology. Referring to FIG. 5, the topology is similar to those of FIGS. 3B and 3C with the inclusion of non-coherent fabric 310. However, differences include memory controller 301 receives requests from coherent fabric 200, non-coherent fabric 300 and IPs/fabrics 312. Another difference is that IP request interface(s) 213 from IPs/fabrics 312 are to both non-coherent fabric 310 and coherent fabric 200. Also, memory response interface(s) 221 delivers responses to both coherent fabric 200 and non-coherent fabric 310.

Furthermore, as mentioned above, in other embodiments, there may be two or more copies of the mode memory (e.g., registers) to define different modes of operation for two or more address regions of memory.

Figure 6:
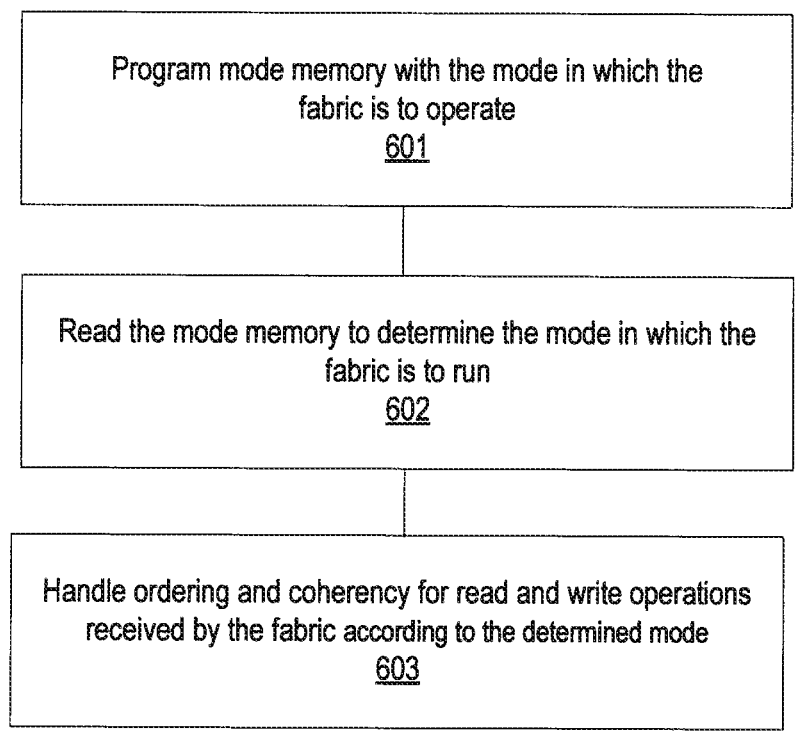
FIG. 6 is a flow diagram of one embodiment of a process for supporting multiple topologies.

FIG. 6 is a flow diagram of a process performed by a coherent fabric to support different topologies. The process is performed by processing logic that may comprise hardware (circuitry, dedicated logic, etc.), software (such as is run on a general purpose computer system or a dedicated machine), or a combination of both.

Referring to FIG. 6, the process begins by programming mode memory with the mode in which the fabric is to operate (processing block 601). Next, the processing logic reads the mode memory to determine the mode in which the fabric is to run (processing block 602). In one embodiment, the fabric is able to run one of these modes that includes a first mode in which a memory controller is connected to the fabric; a second mode in which a memory controller is connected to a non-coherent input/output (I/O) fabric connected to the fabric; and a third mode in which an intellectual property (IP) core is connected to a memory controller connected to a non-coherent input/output (I/O) fabric connected to the fabric.

After determining the mode, processing logic handles ordering and coherency for read and write operations received by the fabric (processing block 602).

In a first example embodiment, a semiconductor device comprises mode memory to store information indicative of one of the plurality of modes and a first fabric operable in a plurality of modes, wherein the fabric comprises logic coupled to the mode memory to control processing of read and write requests to memory received by the first fabric according to the mode identified by the information indicative.

In another example embodiment, the subject matter of the first example embodiment can optionally include that the logic controls state of one or more cache memories and at least one data buffer and the type and timing of requests on memory, and controls timing of responses to the requests.

In another example embodiment, the subject matter of the first example embodiment can optionally include that the logic responds to software initiated transactions to ensure that software initiated cache control and ordering events are handled.

In another example embodiment, the subject matter of the first example embodiment can optionally include that the plurality of modes comprises: a first mode in which a memory controller is connected to the first fabric; a second mode in which a memory controller is connected to a non-coherent input/output (I/O) fabric connected to the first fabric; and a third mode in which an intellectual property (IP) core is connected to a memory controller connected to a non-coherent input/output (I/O) fabric connected to the first fabric.

In another example embodiment, the subject matter of the first example embodiment can optionally include that the logic causes all write operations to memory to be posted without waiting for a completion response in a first of the plurality of modes and causes writes to be sent as posted or non-posted with a completion response required in one or more other of the plurality of modes.

In another example embodiment, the subject matter of the first example embodiment can optionally include that the logic allows cached and uncached write operations to memory to be reordered in a first of the plurality of modes and only allows cached write operations to be reordered in a second of the plurality of modes.

In another example embodiment, the subject matter of the first example embodiment can optionally include that the logic does not complete one or more of fence or cache invalidate operations until one or more prior write combining write operations, non-temporal write operations or cache line flush operations to memory have received their completion responses in one or more of the plurality of modes and does not trigger any action by the fabric in another of the plurality of modes.

In another example embodiment, the subject matter of the first example embodiment can optionally include that the logic does not forward uncacheable write operations to either memory or an input/output (I/O) fabric until one or more prior write combining write operations or non-temporal write operations to memory have received their completion responses in one or more of the plurality of modes and does not trigger any action by the fabric in another of the plurality of modes.

In another example embodiment, the subject matter of the first example embodiment can optionally include that the mode memory is located in the first fabric.

In another example embodiment, the subject matter of the first example embodiment can optionally include that the mode memory is set via BIOS, firmware, strap, fuse or software.

In another example embodiment, the subject matter of the first example embodiment can optionally include that the mode is set based on an address of a memory request received by the fabric.

In another example embodiment, the subject matter of the first example embodiment can optionally include that wherein the mode is set based on a mode of the processing unit.

In another example embodiment, the subject matter of the first example embodiment can optionally include that the mode is set based on a virtual machine identifier (ID).

In a second example embodiment, a system comprises: a semiconductor device having mode memory to store information indicative of one of the plurality of modes and a first fabric operable in a plurality of modes, the fabric comprising logic coupled to the mode memory to control processing of read and write requests to memory received by the first fabric according to the mode identified by the information indicative of one of the plurality of modes; at least one memory controller coupled to the semiconductor device; and at least one memory coupled to the at least one memory controller.

In another example embodiment, the subject matter of the second example embodiment can optionally include that the logic controls state of one or more cache memories and at least one data buffer and the type and timing of request on memory, and controls timing of responses to the requests.

In another example embodiment, the subject matter of the second example embodiment can optionally include that the logic responds to software initiated transactions to ensure that software initiated cache control and ordering events are handled.

In another example embodiment, the subject matter of the second example embodiment can optionally include that the plurality of modes comprises: a first mode in which a memory controller is connected to the first fabric; a second mode in which a memory controller is connected to a non-coherent input/output (I/O) fabric connected to the first fabric; and a third mode in which an intellectual property (IP) core is connected to a memory controller connected to a non-coherent input/output (I/O) fabric connected to the first fabric.

In another example embodiment, the subject matter of the second example embodiment can optionally include that the at least one memory comprises a dynamic random access memory (DRAM), a static RAM (SRAM), or both a DRAM and an SRAM.

In another example embodiment, the subject matter of the second example embodiment can optionally include that the logic causes all write operations to memory to be posted without waiting for a completion response in a first of the plurality of modes and causes write operations to be sent as posted or non-posted with a completion response required in one or more other of the plurality of modes.

In another example embodiment, the subject matter of the second example embodiment can optionally include that the logic allows cached and uncached write operations to memory to be reordered in a first of the plurality of modes and only allows cached write operations to be reordered in a second of the plurality of modes.

In another example embodiment, the subject matter of the second example embodiment can optionally include that the logic does not complete one or more of fence or cache invalidate operations until one or more prior write combining write operations, non-temporal write operations or cache line flush operations to memory have received their completion responses in one or more of the plurality of modes and does not trigger any action by the fabric in another of the plurality of modes.

In another example embodiment, the subject matter of the second example embodiment can optionally include that the logic does not forward uncacheable write operations to either memory or an input/output 10 fabric until one or more prior write combining write operations or non-temporal write operations to memory have received their completion responses in one or more of the plurality of modes and does not trigger any action by the fabric in another of the plurality of modes.

In another example embodiment, the subject matter of the second example embodiment can optionally include that the mode memory is located in the first fabric.

In another example embodiment, the subject matter of the second example embodiment can optionally include that the mode memory is set via BIOS, firmware, strap, fuse or software.

In a third example embodiment, a method comprises reading mode memory to determine a mode in which a first fabric of a semiconductor device is to run; and handling ordering and coherency for read and write operations received by the fabric based on the mode identified by reading the mode memory.

In another example embodiment, the subject matter of the third example embodiment can optionally include that the plurality of modes comprises: a first mode in which a memory controller is connected to the first fabric; a second mode in which a memory controller is connected to a non-coherent input/output (I/O) fabric connected to the first fabric; and a third mode in which an intellectual property (IP) core is connected to a memory controller connected to a non-coherent input/output (I/O) fabric connected to the first fabric.

In another example embodiment, the subject matter of the second example embodiment can optionally include programming the mode memory.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A semiconductor device comprising:
   mode memory to store information indicative of one of a plurality of modes, each mode of the plurality of modes corresponding to a different interconnect topology;
   one or more request interfaces operable to receive requests to memory;
   one or more response interfaces operable to send responses to the requests to the memory; and
   a first fabric coupled to the one or more request interfaces and one or more response interfaces and operable in the plurality of modes, the fabric comprising:
      ordering and coherency logic coupled to the mode memory to control processing of read and write requests to the memory received by the first fabric according to one mode of the plurality of modes identified by the information indicative stored in the mode memory, and wherein the ordering and coherency logic is operable to control timing of the requests on the memory from the one or more request interfaces and timing of the responses on the one or more response interfaces to the requests.

2. The semiconductor device defined in claim 1 wherein the logic controls state of one or more cache memories and at least one data buffer and the type.

3. The semiconductor device defined in claim 2 wherein the logic responds to software initiated transactions to ensure that software initiated cache control and ordering events are handled.

4. The semiconductor device defined in claim 1 wherein the plurality of modes comprises:
   a first mode in which a memory controller is connected to the first fabric;
   a second mode in which a memory controller is connected to a non-coherent input/output (I/O) fabric connected to the first fabric; and
   a third mode in which an intellectual property (IP) core is connected to a memory controller connected to a non-coherent input/output (I/O) fabric connected to the first fabric.

5. The semiconductor device defined in claim 1 wherein the logic causes all write operations to memory to be posted without waiting for a completion response in a first of the plurality of modes and causes writes to be sent as posted or non-posted with a completion response required in one or more other of the plurality of modes.

6. The semiconductor device defined in claim 1 wherein the logic allows cached and uncached write operations to memory to be reordered in a first of the plurality of modes and only allows cached write operations to be reordered in a second of the plurality of modes.

7. The semiconductor device defined in claim 1 wherein the logic does not complete one or more of fence or cache invalidate operations until one or more prior write combining write operations, non-temporal write operations or cache line flush operations to memory have received their completion responses in one or more of the plurality of modes and does not trigger any action by the fabric in another of the plurality of modes.

8. The semiconductor device defined in claim 1 wherein the logic does not forward uncacheable write operations to either memory or an input/output (I/O) fabric until one or more prior write combining write operations or non-temporal write operations to memory have received their completion responses in one or more of the plurality of modes and does not trigger any action by the fabric in another of the plurality of modes.

9. The semiconductor device defined in claim 1 wherein the mode memory is located in the first fabric.

10. The semiconductor device defined in claim 1 wherein the mode memory is set via BIOS, firmware, strap, fuse or software.

11. The semiconductor device defined in claim 1 wherein the mode is set based on an address of a memory request received by the fabric.

12. The semiconductor device defined in claim 1 wherein the mode is set based on a mode of the processing unit.

13. The semiconductor device defined in claim 1 wherein the mode is set based on a virtual machine identifier (ID).

14. A system comprising:
a semiconductor device having
mode memory to store information indicative of one of a plurality of modes, each mode of the plurality of modes corresponding to a different interconnect topology;
one or more request interfaces operable to receive requests to memory;
one or more response interfaces operable to send responses to the requests to the memory;
a first fabric coupled to the one or more request interfaces and one or more response interfaces and operable in the plurality of modes, the fabric comprising ordering and coherency logic coupled to the mode memory to control processing of read and write requests to the memory received by the first fabric according to one mode of the plurality of modes identified by the information indicative stored in the mode memory, and wherein the ordering and coherency logic is operable to control timing of the requests on the memory from the one or more request interfaces and timing of the responses on the one or more response interfaces to the requests; and
at least one memory controller coupled to the semiconductor device; and
at least one memory coupled to the at least one memory controller.

15. The system defined claim 14 wherein the logic controls state of one or more cache memories and at least one data buffer.

16. The system defined in claim 15 wherein the logic responds to software initiated transactions to ensure that software initiated cache control and ordering events are handled.

17. The system defined in claim 14 wherein the plurality of modes comprises:
a first mode in which a memory controller is connected to the first fabric;
a second mode in which a memory controller is connected to a non-coherent input/output (I/O) fabric connected to the first fabric; and
a third mode in which an intellectual property (IP) core is connected to a memory controller connected to a non-coherent input/output (I/O) fabric connected to the first fabric.

18. The system defined in claim 14 where the at least one memory comprises a dynamic random access memory (DRAM), a static RAM (SRAM), or both a DRAM and an SRAM.

19. The system defined in claim 14 wherein the logic causes all write operations to memory to be posted without waiting for a completion response in a first of the plurality of modes and causes write operations to be sent as posted or non-posted with a completion response required in one or more other of the plurality of modes.

20. The system defined in claim 14 wherein the logic allows cached and uncached write operations to memory to be reordered in a first of the plurality of modes and only allows cached write operations to be reordered in a second of the plurality of modes.

21. The system defined in claim 14 wherein the logic does not complete one or more of fence or cache invalidate operations until one or more prior write combining write operations, non-temporal write operations or cache line flush operations to memory have received their completion responses in one or more of the plurality of modes and does not trigger any action by the fabric in another of the plurality of modes.

22. The semiconductor system defined in claim 14 wherein the logic does not forward uncacheable write operations to either memory or an input/output (I/O) fabric until one or more prior write combining write operations or non-temporal write operations to memory have received their completion responses in one or more of the plurality of modes and does not trigger any action by the fabric in another of the plurality of modes.

23. The system defined in claim 14 wherein the mode memory is located in the first fabric.

24. The system defined in claim 14 wherein the mode memory is set via BIOS, firmware, strap, fuse or software.

25. A method comprising:
reading mode memory to determine which mode of a plurality of modes in which a first fabric of a semiconductor device is to run, each mode of the plurality of modes corresponding to a different interconnect topology of which the first fabric is a part, wherein the plurality of modes comprises
a first mode in which a memory controller is connected to the first fabric;
a second mode in which a memory controller is connected to a non-coherent input/output (I/O) fabric connected to the first fabric; and
a third mode in which an intellectual property (IP) core is connected to a memory controller connected to a non-coherent input/output (I/O) fabric connected to the first fabric; and
handling, with ordering and coherency logic of the first fabric of a semiconductor device, ordering and coherency for read and write operations received by the first fabric according to which mode of the plurality of modes is identified by reading the mode memory.

26. The method defined in claim 25 further comprising programming the mode memory.

* * * * *